United States Patent
Wackerly et al.

(10) Patent No.: US 10,601,766 B2
(45) Date of Patent: Mar. 24, 2020

(54) DETERMINE ANOMALOUS BEHAVIOR BASED ON DYNAMIC DEVICE CONFIGURATION ADDRESS RANGE

(71) Applicant: Hewlett Packard Enterprise Development LP, Houston, TX (US)

(72) Inventors: Shaun Wackerly, Roseville, CA (US); Shaun Wakumoto, Roseville, CA (US); Duane Edward Mentze, Roseville, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 158 days.

(21) Appl. No.: 15/556,732

(22) PCT Filed: Mar. 13, 2015

(86) PCT No.: PCT/US2015/020434
§ 371 (c)(1),
(2) Date: Sep. 8, 2017

(87) PCT Pub. No.: WO2016/148676
PCT Pub. Date: Sep. 22, 2016

(65) Prior Publication Data
US 2018/0063072 A1    Mar. 1, 2018

(51) Int. Cl.
*G06F 15/173* (2006.01)
*H04L 29/12* (2006.01)
*H04L 29/06* (2006.01)

(52) U.S. Cl.
CPC ...... *H04L 61/103* (2013.01); *H04L 29/06102* (2013.01); *H04L 61/2015* (2013.01); *H04L 63/126* (2013.01); *H04L 63/1408* (2013.01); *H04L 69/161* (2013.01); *H04L 29/12028* (2013.01)

(58) Field of Classification Search
None
See application file for complete search history.

(56) References Cited

U.S. PATENT DOCUMENTS

| 7,962,957 B2 | 6/2011 | Keohane et al. |
| 7,996,537 B2 | 8/2011 | Nesz et al. |
| 8,352,618 B2 * | 1/2013 | Perez ........... H04L 29/12028 709/227 |
| 2004/0006712 A1 | 1/2004 | Yao et al. |

(Continued)

OTHER PUBLICATIONS

Denial of Service (DOS) Secured Virtual Tenant Networks (VTN), Nov 20, 2012, 11 Pgs.

(Continued)

*Primary Examiner* — Phuoc H Nguyen
(74) *Attorney, Agent, or Firm* — Hewlett Packard Enterprise Patent Department (57) ABSTRACT

Example embodiments disclosed herein relate to determining whether a device exhibits anomalous behavior based on a set of rules, address usage information, and address range information. Address usage information for a device communicating on a data plane of a network implemented using switches is received via a control plane. Address range information for the network is maintained. Whether the device exhibits anomalous behavior is determined based on the set of rules, address usage information, and address range information.

15 Claims, 4 Drawing Sheets

(56) References Cited

U.S. PATENT DOCUMENTS

| | | | |
|---|---|---|---|
| 2006/0171403 | A1 | 8/2006 | Kim et al. |
| 2009/0238088 | A1* | 9/2009 | Tan ............... H04L 41/0631 370/252 |
| 2010/0046378 | A1* | 2/2010 | Knapp ............ H04L 41/0604 370/242 |
| 2010/0091684 | A1 | 4/2010 | Winter et al. |
| 2010/0122342 | A1* | 5/2010 | El-Moussa ........ H04L 63/1425 726/22 |
| 2010/0188990 | A1* | 7/2010 | Raleigh ........... G06Q 10/06375 370/252 |
| 2011/0019566 | A1* | 1/2011 | Leemet ............ H04L 12/14 370/252 |
| 2013/0166706 | A1 | 6/2013 | Christenson et al. |
| 2013/0166737 | A1 | 6/2013 | Christenson et al. |
| 2013/0347103 | A1* | 12/2013 | Veteikis .............. H04L 43/04 726/22 |
| 2014/0089506 | A1 | 3/2014 | Puttaswamy et al. |
| 2014/0156829 | A1* | 6/2014 | Lee .................. H04L 67/22 709/224 |
| 2014/0173018 | A1 | 6/2014 | Westphal et al. |
| 2015/0242415 | A1* | 8/2015 | Martini ............. H04W 4/029 707/694 |
| 2016/0050205 | A1* | 2/2016 | Heller .............. H04L 63/10 726/4 |
| 2016/0224899 | A1* | 8/2016 | Nguyen ............ G06N 7/005 |
| 2016/0261482 | A1* | 9/2016 | Mixer ............... H04L 43/12 |
| 2018/0007075 | A1* | 1/2018 | Wackerly .......... H04L 12/22 |

OTHER PUBLICATIONS

International Searching Authority, The International Search Report and the Written Opinion, dated Dec. 11, 2015, PCT/US2015/020434, 13 Pgs.

\* cited by examiner

DETERMINE ANOMALOUS BEHAVIOR BASED ON DYNAMIC DEVICE CONFIGURATION ADDRESS RANGE

BACKGROUND

A network can include a variety of devices that transfer data throughout the network. This data is typically contained within packets that are transferred by switches, routers, or other network devices. Often times, software-defined networking (SDN) devices are used for implementing a data network.

BRIEF DESCRIPTION OF THE DRAWINGS

The following detailed description references the drawings, wherein.

DETAILED DESCRIPTION

Malicious or suspicious behavior by network end-hosts can impact network availability and security for other network end-hosts. Malicious activity or behavior is when an end-host is explicitly attempting to disrupt network behavior for other end-hosts on the network. Suspicious activity is behavior that could possibly be malicious or could be normal network activity.

Examples of specific malicious or suspicious activity includes an end-host misusing dynamic addressing and suspicious address requests. In one example, dynamic addressing can be implemented using a Dynamic Device Configuration Protocol (DDCP) server or multiple DDCP servers. DDCP is any network protocol using dynamically addressed networks (e.g., Internet Protocol (IP) networks such as IPv4, IPv6, etc.) for dynamically distributing network configuration parameters from a DDCP server to DDCP end-hosts. These network configuration parameters can include parameters such as IP addresses, the IP address of the DDCP server, the IP address of a gateway, Domain Name System (DNS) servers, Windows Internet Name Service (WINS) servers, etc. Further when an address is included as a parameter, such as the IP address is provided, there can be an expiration time or timeout time or duration associated. An example of a DDCP protocol is the Dynamic Host Configuration Protocol (DHCP), which is a standardized protocol.

Abnormal behavior by end-hosts can be indicative of the end-host being set up for a suspicious or malicious purpose. End-hosts in the network may attempt to use addresses that are not acquired in a legitimate way. In one example, an end-host that uses a DDCP address that is not assigned to it may be attempting to snoop information intended for another end-host that is assigned the address. In another example, if the end-host uses a DDCP address assigned to another end-host, there can be a conflict in the system. In a further example, the end-host may desire to perform an act that is more difficult to track by using the address. Thus, an end-host can attempt to use an address by using a non-legitimate DDCP server and/or by using a static address on the network.

A switch may be configured to monitor DDCP assignments and enforce those address assignments on its own ports and virtual local area networks (VLANs). However, this would not suffice if malicious or suspicious behavior occurs at another switch in the same dynamically-assigned subnet.

Accordingly, various embodiments described herein relate to using a Software Defined Networking (SDN) controller to manage switches to help ensure that behavior of end-hosts is legitimate by determining end-hosts that may be suspicious or malicious in a network. Further, the SDN controlled system can mitigate risks from the end-hosts (e.g., by disconnecting the end-host, blocking the end-host from the network, etc.).

Processes described herein can be used for detecting and mitigating anomalous behavior of an end-host. As detailed herein, an SDN controller can detect malicious use of dynamic addresses by end-hosts. This can be implemented because the SON controller can have visibility into when the dynamic address is assigned to the host, when the host should stop using it, and how long the host is using the address. The visibility can occur because the SDN controller can send a rule or multiple rules to switches and other network elements on the network to provide information about such actions to the SDN controller.

In one example, the SDN controller may have knowledge of the pools of dynamic addresses (either by static configuration, other approaches described herein, or the like). Using that knowledge, if the SDN controller detects that a host is using an address from the dynamic address range, but the host has not received authorization to use such an address, then a security action can be performed (e.g., that host could be blocked from using the address on the network). In certain examples, knowledge of the pools can be implemented by keeping DDCP address range information for the network. As used herein, DDCP address range information includes ranges of DDCP addresses associated with DDCP servers. The DDCP address range information further includes information about which of the DDCP addresses are assigned and what end-host the DDCP address is assigned (e.g., based on a corresponding device identifier such as a Media Access Control (MAC) address or other device identifier (e.g., device location or port)).

The pools of dynamic addresses can be maintained. As such, timeout or lease time indicating the time period for which an address is valid can be used in determining whether the end-host has authorization for using the address. For example, the end-host can be provided an address legitimately, but then timeout. At this point, the end-host should request it again. However, if it does not, then it would be considered using the address in an illegitimate way. In one example, the SDN controller could keep track of the timeout value for each address, and if the address is used past the valid time then the SDN controller would disallow the host from using that address to communicate on the network (by blocking the address as a source from the given port and MAC of the host).

In another example, the SDN controller could also detect suspicious activity in relation to DDCP address requests. If an end-host issues a DDCP request for an address which it has never held without performing a discovery, then that indicates suspicious activity and the host can be more deeply monitored. The end-host may merely be exhibiting normal behavior, or it may be attempting to gain control of an address in an effort to assume the identity of the end-host that previously held that address (e.g., to hosts outside the subnet who are unaware that the address has been reassigned). The SON controller can then quarantine, more deeply inspect, or otherwise punish the source of suspicious activity.

Figure 1:
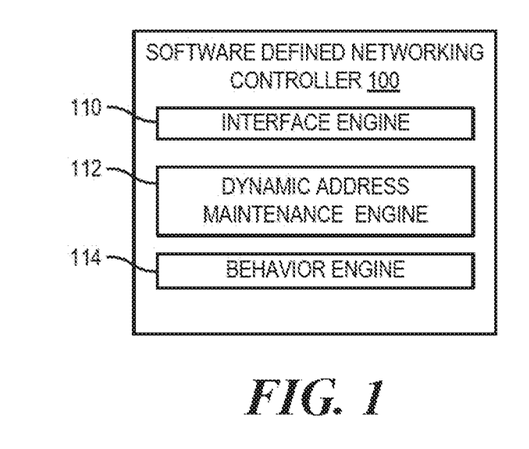
FIG. 1 is a block diagram of a Software Defined Networking controller capable of determining anomalous behavior based on Dynamic Device Configuration Protocol (DDCP) address range information, according to one example.
Figure 2:
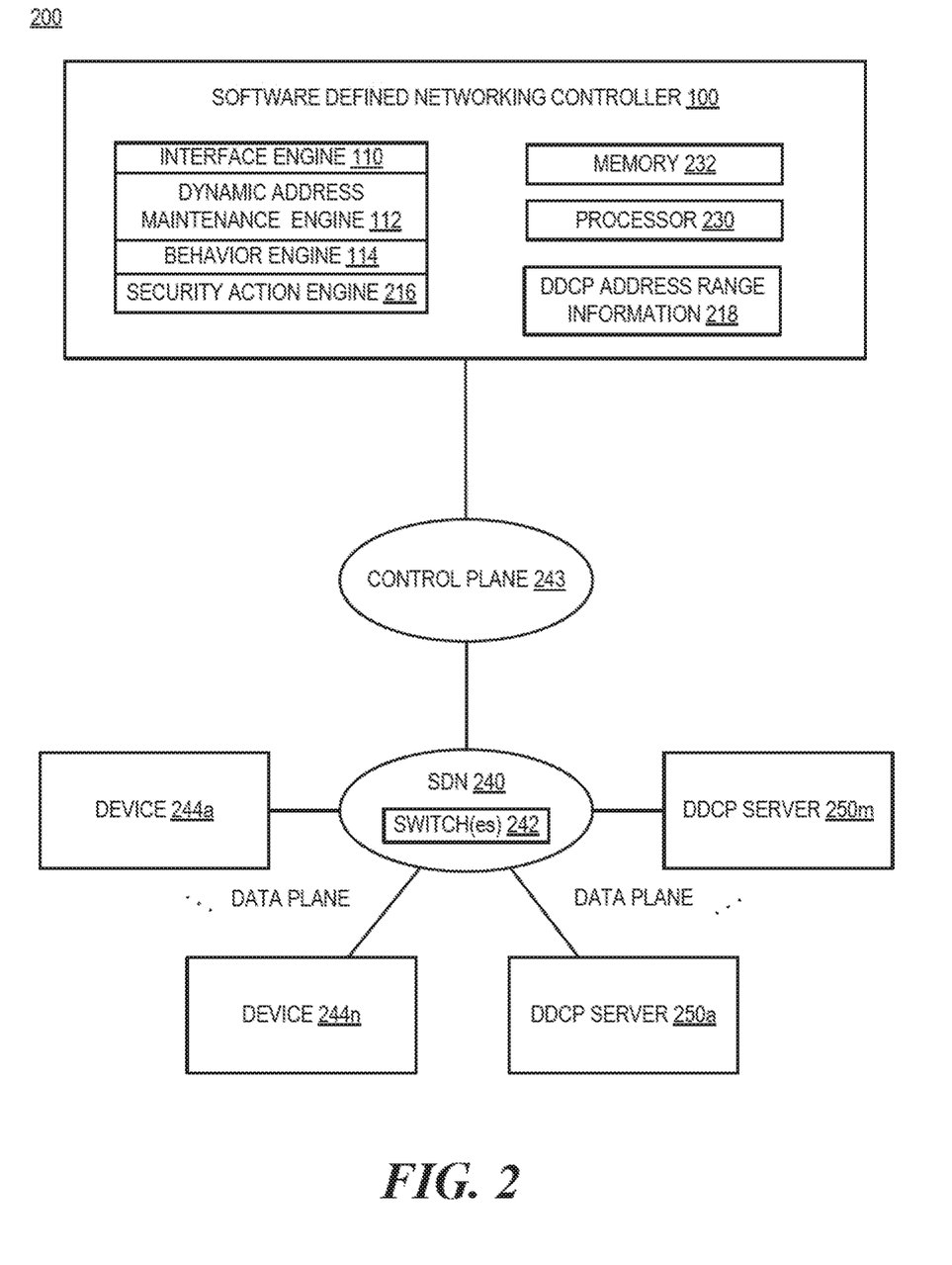
FIG. 2 is a block diagram of a system including a Software Defined Networking controller capable of determining anomalous behavior based on DDCP address range information, according to one example.

FIG. 1 is a block diagram of a Software Defined Networking controller capable of determining anomalous behavior based on Dynamic Device Configuration Protocol (DDCP) address range information, according to one example. FIG. 2 is a block diagram of a system including a Software Defined Networking controller capable of determining anomalous behavior based on DDCP address range information, according to one example.

In one example, SDN controller 100 can include an interface engine 110, a dynamic address maintenance engine 112, and a behavior engine 114. In another example, the SDN controller 100 can also include a security action engine 216, DDCP address range information 218, at least one processor 230, and memory 232.

The SDN controller 100 can be implemented as part of a system 200, which can include a Software Defined Network 240 that is connected to the SDN controller 100 via a control plane 243. One or more SDN controllers can be used to control the SDN 240. The SDN 240 can be implemented using a network fabric that may include wired and wireless network elements, such as switches 242, routers, bridges, wireless access points, and the like. In certain examples, a switch 242 or network switch is a computer networking device that connects devices together in a computer network by using packet switching to forward data to a destination device. A switch can also act as or be included in a bridge, a router, other network elements, etc.

A SDN 240 separates the control plane 243 from the data plane, such that a network controller (here, SDN controller 100) can make decisions regarding where and how network traffic is to be sent while the data plane (here, user communications on the SDN 240) can be programmed by the network controller to forward and manipulate the traffic. In certain examples, there is also an application plane consisting of one or more SDN applications whose functionality can be implemented by the network controller.

The SDN 240 can be implemented such that devices 244a-244n can access other devices in the SDN 240 and/or other devices (e.g., via a gateway or multiple gateways to the Internet or other network). DDCP address range information can be monitored and maintained by the SDN controller 100.

As used herein, DDCP is a protocol used on networks for dynamically distributing network configuration parameters (e.g., addresses such as IP addresses, network parameters, etc.). The DDCP protocol includes at least one message from a client device 244 to the network to ask for an address from a DDCP server 250 on the network. One DDCP server 250a or multiple DDCP servers 250a-250m can be implemented for use with the network. Further, the DDCP protocol includes at least one message from the DDCP server 250 offering an address to the client device 244.

In one example, DDCP can use a 4-way handshake for new clients. The first portion of the handshake includes the client device 244 broadcasting to the network a "DDCP Discover," which is an advertisement asking any DDCP servers 250 for an address. The second portion is unicast from the respective DDCP server 250 to the client device 244. This portion is a "DDCP Offer" where the DDCP server responds to the client with an address that the DDCP server can provide to the client device 244. The third portion includes a broadcast from the client device 244 to the network that has a "DDCP Request," where the client device 244 has reviewed the offer(s) and requests a specific address. The fourth portion is a unicast from the DDCP server 250 to the client device 244 with a "DDCP Acknowledgement/Negative Acknowledgement (ACK/NAK)" where the DDCP server 250 acknowledges use of the address by the client device 244 or rejects it. Further, in some examples, a DDCP information message can be requested by the client device 244. Moreover, in some examples, the client device 244 can send a "DDCP Release" message to the DDCP server 250 to release the IP address assigned to the client device 244. The DDCP server 250 can then open up that IP address for use.

The SDN controller 100 can manage network elements of the SDN 240 to send (e.g., forward, send copies, etc.) packets related to DDCP or other protocols such as Address Determination Protocol (ADP) to the SDN controller 100 (e.g., via one or more switch(es) 242). The forwarding can be based on a header associated with a packet.

In one example, ADP is a protocol used for resolution of network layer addresses into link layer addresses. An example of ADP is the Address Resolution Protocol (ARP). As noted, ADP is used to convert a network layer address (e.g., an IP address) to a link layer address (e.g., a MAC address). A network element can keep track of mappings of network layer addresses to link layer addresses. In some examples, the SDN controller 100 can also keep track of the mappings. When a connection is created for accessing an end-host on the subnet and the link layer address is not known for the network layer address, a network element (e.g., a router, gateway, etc.) sends out an ADP resolution request. A resolution request sends a message to each host on the network asking whether they are associated with the address (e.g., by sending a message including the address to destination FF:FF:FF:FF:FF:FF MAC address). ADP reply messages can be sent by each host that claims the address. ADP reply messages can be forwarded by network elements (e.g., switches 242) to the SDN controller 100. The SDN controller 100 can maintain an ADP table mapping the network layer addresses to link layer addresses. Moreover, other network elements and/or other devices on the SDN 240 or other connected network (e.g., connected via the Internet) can keep an ADP table.

The interface engine 110 can be used to configure network elements on the SDN 240 via the control plane 243. Rules can be configured on the network elements. For example, the SDN controller 100 can configure network elements to send address usage information of devices 244a-244n to the interface engine 110.

Address usage information about a device 244 on the SDN 240 includes information about whether the device is using or requesting a link layer address (e.g., an IP address). In one example, the address usage information includes the address used by the respective device 244. In another example, the address usage information further includes a timeout time (e.g., a time or time period that can be used to determine when the address is no longer valid for the respective device 244). Further, address usage information can include a request to a DDCP server for a specific address. In some examples, address usage information can further include a MAC address and/or a port location. Examples of packets providing address usage information include DDCP packets, such as a request, ADP packets, such as an ADP reply, Duplicate Address Detection (DAD) packets, etc. A DAD packet is a packet sent to the subnet before a device 244 connects to the subnet and begins using an address (e.g., an IPv6 address). Certain protocols may be implemented in a manner where it is expected that a client device send a DAD packet before using an address on a subnet to ensure that the address is not currently in use by another device.

The interface engine 110 receives the address usage information (e.g., DDCP Offer packets, ADP packets, etc.). The interface engine 110 can be implemented as an application programming interface. Further, the interface engine 110 may include a network interface card to communicate via the control plane 243. The interface engine 110 can be used to monitor DDCP Offers, ADP reply packets, and the like, in the data plane of the network (e.g., SDN 240).

In certain examples, a data plane is the portion of the network that carries user traffic. This is separate from the control plane 243, which can be used to control the network elements of the SDN 240. As noted, the offers, ADP reply packets, address usage information, etc. can be sent to the interface engine 110 via one or more switches 242. The DDCP Offer includes information identifying the source DDCP server 250 (e.g., an IP address, a MAC address, etc.). In certain examples, the DDCP Offer can further include a destination (e.g., the device 244), an IP address of a server, an IP address of a gateway, IP address offered, combinations thereof, etc. Further, auxiliary data may be sent along with the DDCP Offer (e.g., as with OpenFlow). This may include the source port where the original packet was received by a sending switch 242. Other examples of contents of DDCP Offers include contents of DHCP offer packets. In some examples, DDCP packets/messages can include the same or similar information to corresponding DHCP packets/messages.

SDN controller 100 may have other functionality for managing the network fabric in accordance with a SDN paradigm. An example communications protocol for implementing an SDN network is OpenFlow. As will be appreciated by one of ordinary skill in the art, the described examples may be implemented using other SDN communications protocols.

According to an OpenFlow implementation, switches 242 in network fabric store one or more flow tables for matching and forwarding network traffic received by the switch. The traffic is in the form of packets. The flow tables may include multiple flow table entries including various fields and corresponding information. Flow information may be used to provide address usage information to the SDN controller 100.

The dynamic address maintenance engine 112 can track an address range for each source of the DDCP Offers (e.g., respective DDCP servers 250). When the dynamic address maintenance engine 112 receives a DDCP Offer, the dynamic address maintenance engine 112 can determine whether the source (e.g., DDCP server 250*a*) has previously been seen. If the source has not previously been seen, the dynamic address maintenance engine 112 can determine which addresses the DDCP server 250*a* serves. This can be accomplished via probing as further described below. The dynamic address maintenance engine 112 can thus determine DDCP address range information 218 that deals with associated DDCP servers 250. DDCP address range information 218 includes addresses (e.g., link layer addresses) that are associated with DDCP servers 250.

In some examples, the dynamic address maintenance engine 114 can inject packets to communicate with the DDCP servers 250. The DDCP servers 250 can provide DDCP address range information 218 to any address ranges served by the respective DDCP server 250. For example, the DDCP server 250 can provide information as to what address ranges they serve, the addresses currently assigned, the assignee, associated hardware information (e.g., port location, MAC addresses, etc.), or the like.

The behavior engine 114 can determine whether a device 244 is behaving anomalously. This can be based on a set of rules. The rules can be customized for what behavior should be considered an anomaly.

In one example, if a device 244 uses an address, which can be included in address usage information, on the SDN 240 that is serviced by one of the DDCP servers 250 (e.g., within an associated address range in the DDCP address range information 218), but the address is not currently mapped to the respective device 244, the behavior can be determined by the behavior engine 114 as being anomalous. In this example, the address usage information includes an address used by the respective device 244. The DDCP address range information 218 can include a list of assigned addresses to corresponding device identifiers (e.g., MAC addresses). The anomalous behavior determination can be based on determining that the device 244 is not assigned the address used in the address usage information.

As noted above, the DDCP address range information 218 can include a timeout time associated with assigned addresses. In one example, after the timeout time expires, the interface engine 110 can send an ADP resolution request message for the address. The resolution request can be sent via the control plane 243 into the data plane. In this scenario, the address usage information received by the interface engine 110 is received based on the ADP resolution request. For example, the device 244 sends an ADP reply message indicating that its MAC address is associated with the link layer address. The ADP reply message can be provided, via the control plane 243, to the SDN controller 100. As such, the anomalous behavior determination is based on the timeout time expiring.

In one example, the address usage information includes a request to a DDCP server for a specific address (e.g., via a DDCP Request). In this scenario, the anomalous behavior determination is further based on the specific address being previously unused by the device. A rule implementation by the behavior engine 114 can be that if the device 244 comes into the environment, but previously not held the specific address and does not go through a DDCP handshake, the device behavior is anomalous. It can be considered anomalous because the device can be trying to take information that is meant for another address that held the address previously. If the device previously held the specific address, then it would be less suspicious because the device 244 may be returning to the network from an absence to the SDN 240.

In some examples, the SDN controller 100 can detect that a device (e.g., device 244*a*) has gone offline and cause release of the device 244*a* from an associated DDCP server to reclaim an address that the SDN controller 100 has information inferring that the address is no longer in use. In one example, the SDN controller 100 can use the interface engine 110 to provide a rule to network elements such as switch(es) 242 to provide information via the control plane 243 about connected devices. The information can include, for example, information about a port used by the device 244a. Therefore, the device 244a can be associated with a port. If the port is disconnected, the information can be provided to the SDN controller 100. The SDN controller 100 can then generate a DDCP Release packet to release the device 244a from an associated DOCP Server 250 and, in some examples, may remove it from DDCP address range information 218. Further, in some examples, the SDN controller 100 can wait a threshold time before sending the DDCP Release packet in case the device 244a returns to the network.

Similarly, a rule can be sent to network elements to send a copy of DDCP Release packets, via the control plane 243, to the SDN controller 100. The DDCP Release packets can be used to remove IP addresses as being in use by the respective device 244 in the DDCP address range information.

In another example, the interface engine 110 can receive DAD packets on the control plane 243 via the switch(es) 242. The interface engine 110 can also receive, via the control plane 243, a copy of ADP reply messages used on the data plane via the switch(es) 242. As noted, the address usage information can be included in one of the ADP reply messages, which can include the address used by the device 244 on the network. As noted above, in another implementation, the address usage information can be included in flow information. The behavior engine 114 can determine that the device exhibits anomalous behavior due to a determination that the address was used without a corresponding DAD packet sent by the device 244. This can be implemented as a rule, for example, in a network environment where a device is supposed to announce, via a DAD packet, that the device would like to use the address before it uses the address.

In a further example, a rule can indicate that use of an address is anomalous if it is outside of the address ranges of the DDCP servers 250 monitored. In this scenario, an administrator may add exceptions (e.g., gateways, printers, etc.) that may be better suited for static use.

The security action engine 216 can be used to perform a security action in response to anomalous behavior. In one example, the security action can be to log and/or send a message to an administrator about the anomaly. In another example, the security action engine 216 can restrict access to a device 244 associated with anomalous behavior. In one example, the address usage information includes a MAC address and/or port location. The security action engine 216 can send rules to network elements to filter out packets to the MAC address, disable the port location, etc. based on a determination of anomalous behavior.

Behavior of the SDN controller 100 can change based on the address space used. For example, if a large portion of the address space is served by the DDCP servers 250, approaches to maintaining the DDCP address range information 218 may change. In one example, determining whether to send an ADP resolution request after a timeout may depend on the amount of traffic created when addresses expire.

As noted above, the dynamic address maintenance engine 112 can maintain DDCP address range information 218. In the example of DHCP for IPv4, packets can be tracked based on a match of UDP source and destination port values. In this example, traffic that includes ip_proto=UDP, source port=67, and destination port=68 and/or traffic that includes ip_proto=UDP, source port=68, and destination port 67 can be monitored. As such, a switch can look at a header or multiple headers of a packet and send the packet to the SDN controller 100 via the control plane 243. In some examples, sending of the packet can include sending a copy of the packet, where another packet continues to its intended recipient. In other examples, sending the packet may include stopping regular distribution of the packet. In one example, the packets sent include the DDCP Offer packets. For other protocols, other Ethertypes, UDP source and destination port values, etc. can be monitored.

In one example, probing includes injection of packets by the SDN controller 100, via the control plane 243, to the DDCP server 250. Because the SDN controller 100 has access to the DDCP packets, it can form messages to the DDCP server 250a and send the messages, via the control plane 243, to the SDN 240 to forward via the data plane to the DDCP server 250a. As such, in one example, the dynamic address maintenance engine 112 can cause injection of the packets to form the message(s) to the data plane to request a specific address from the DDCP server 250a. In the case of the DHCP, the message can be a DHCP request to the server for the specific address. In some examples, the SDN controller 100 can generate a fake machine identifier to perform the request. Because the SDN controller 100 has a strategic point of control for the SDN 240, it can form and inject packets, via one of the controlled switches 242, to go to the DDCP server 250a. In various examples, the SDN controller 100 can pretend to be various end-hosts at different locations with different MAC addresses. The DDCP server 250a responds with an ACK or a NAK. The SDN controller 100 can cause the SDN 240 (e.g., switches 242 in the SDN 240) to forward the ACK or NAK to the SDN controller 100. If the SDN controller receives an ACK, the dynamic address maintenance engine 112 can record that the DDCP server 250a is serves that IP address. A release notification can then be injected, by the interface engine 110, into the SDN 240, via the control plane 243 to the DDCP server 250a. In the example of DHCP, a DHCP Release message can be formed and sent to the server.

Multiple probes can be sent to the DDCP server 250a to determine the address range associated with the DDCP server 250a. One approach that can be used is to iteratively probe the DDCP server 250a to determine the address range.

The probes can begin at the IP address seen as offered and go up and down. For example, if the IP address seen was 192.168.1.106, the probes may go to 192.168.1.107, 192.168.1.108, 109 . . . , and so on in one direction and 192.168.1.105, 192.168.1.104, 103 . . . and so on in the other direction. In one example, this can be performed in each direction until a NAK is received. In another example, this can be performed in each direction until a threshold number of successive NAKs are received. In one example, the threshold number is more than 1. The using a threshold number of NAKs can be used to take into account that one or more of the addresses may have already been allocated. In some examples, the reception of a NAK indicates that the DDCP server 250a failed to provide an IP address. The address range associated to the DDCP server 250a would include the IP addresses of the successful IP address requests before failure.

As noted earlier, the addresses probed can also be released. In one example, the releasing can occur after each probe is sent. In another example, the releasing can occur after the probing is complete to determine the address range. The release requests can be specific to the IP address requested during the respective probes.

In other examples, other probing approaches can be used to determine the IP address range for the DDCP server 250a.

Various boundary search approaches can be used. For example, a binary search approach can be used to determine the address range in each section. Probes can be sent for the boundaries of the address range. In one simple example, the subnet mask for the network can be 255.255.255.0. In this example, the IP address range requested by probes is based on the seen IP address as a start point (e.g., if the IP address seen is 192.168.1.202, the upper bound can be found by doing a binary search between 192.168.1.202 and 192.168.1.255 and a lower bound can be found by doing a binary search between 192.168.1.1 and 192.168.1.202). Here, when looking for the upper bound, the highest addressable address (e.g., in this case, 192.168.1.255) can be tried, if it is an ACK, it can be the upper bound because it is already at the top of the addressable range. If it is a NAK, the midpoint between the start point and the tried boundary (in this case 192.168.1.229) can be used. If the midpoint could be one of 2 numbers, a floor or ceiling can consistently be used. If the midpoint is a NAK, the next midpoint to check is between the start point and the midpoint. If the midpoint is an ACK, the next midpoint to check is between the midpoint and the last tried address (192.168.1.255). This can be repeated until the upper boundary is found, which is when the binary search approach converges. Similarly, the lower boundary can be found. In other examples, the seen IP address need not be used, but probes can be sent to addresses using a start point in the middle or at random.

The highest addressable address can be gleamed from a subnet mask. In some examples, this is known to the SDN controller 100. In other examples, the subnet mask can be determined from an offer by the DDCP server. Moreover, if the offer does not include the subnet mask, the SDN controller 100 may request additional information including the subnet mask (e.g., in DHCP, via a DHCP information request). Moreover, if the subnet mask is not known, the highest addressable address may be determined from other information about the subnet. For example, the SDN controller 100 could assume that the subnet in the example above was 192.168.0.0/16 with the highest address in the range being 192.168.255.225. Similarly, in some examples, the lower bound of the addressable range of the subnet can be based on the subnet mask. In the example above with the subnet mask of 255.255.255.0, the lower bound to start the binary search can be 192.168.1.1 or 192.168.1.2 if there is a known network gateway installed at 192.168.1.1. The lower bound can change based on the subnet mask (e.g., if the subnet mask has a prefix size of /28, the addressable range may not start at 1).

In some examples, when a DDCP server 250 is first seen, an address range associated with it is found. Further, in some examples, an initiation phase can be put in place to determine a baseline of the DDCP servers 250 associated with the SDN 240. As such, these DDCP servers 250 can be considered as being known official DDCP servers 250.

Further, as DDCP packet information can be monitored by the SDN controller 100, additional security actions may be taken according to rules. For example, one rule may include that if a device (e.g., device 244n) takes more than a threshold number of DDCP addresses, that behavior can be considered an anomaly. This can come from an analysis of the DDCP address range information 218. For example, if a particular MAC address is assigned the threshold number of DDCP addresses, that can be considered an anomaly. Further, similar anomalies can be determined from the MAC address being assigned addresses by more than a threshold number of DDCP servers. Security actions to be taken can include restricting or blocking access, logging, notifying an administrator via a message, combinations thereof, etc.

As noted, system 200 includes devices 244 that communicate with other devices via the SDN 240. In certain examples, the devices 244, 250 are computing devices, such as servers, client computers, desktop computers, mobile computers, etc. In other embodiments, the devices 244 can include special purpose machines. The devices 244, 250 can be implemented via a processing element, memory, and/or other components.

The devices can be connected to other devices via a communication network (e.g., via SDN 240). The communication network can use wired communications, wireless communications, or combinations thereof. Further, the communication network can include multiple sub communication networks such as data networks, wireless networks, telephony networks, etc. Such networks can include, for example, a public data network such as the Internet, local area networks (LANs), wide area networks (WANs), metropolitan area networks (MANs), cable networks, fiber optic networks, combinations thereof, or the like. In certain examples, wireless networks may include cellular networks, satellite communications, wireless LANs, etc.

By way of example, the devices communicate with each other and other components with access to the communication network via a communication protocol or multiple protocols. A protocol can be a set of rules that defines how nodes of the communication network interact with other nodes. Further, communications between network nodes can be implemented by exchanging discrete packets of data or sending messages. Packets can include header information associated with a protocol (e.g., information on the location of the network node(s) to contact) as well as payload information.

The engines 110, 112, 114, 216 include hardware and/or combinations of hardware and programming to perform functions provided herein. Moreover, the modules (not shown) can include programing functions and/or combinations of programming functions to be executed by hardware as provided herein. When discussing the engines and modules, it is noted that functionality attributed to an engine can also be attributed to the corresponding module and vice versa. Moreover, functionality attributed to a particular module and/or engine may also be implemented using another module and/or engine.

Modules (not shown) may include, for example, hardware devices including electronic circuitry for implementing the functionality described herein. In addition or as an alternative, each module may be implemented as a series of instructions encoded on a machine-readable storage medium and executable by at least one processor. It should be noted that, in some embodiments, some modules are implemented as hardware devices, while other modules are implemented as executable instructions.

A processor 230, such as a central processing unit (CPU) or a microprocessor suitable for retrieval and execution of instructions and/or electronic circuits can be configured to perform the functionality of any of the engines or modules described herein. In certain scenarios, instructions and/or other information, such as data structures including address ranges, can be included in memory 232 or other memory. Moreover, in certain embodiments, some components can be utilized to implement functionality of other components described herein.

In some examples, injection of packets can be accomplished via a service insertion. Service insertion is transparently inserting an external service (e.g., backing by the SDN controller 100) into a traffic flow or into the traffic processing pipeline. Flows can be redirected to the service provided by the SDN controller 100 and reinjected to a forwarding pipeline. In one example, a DDCP packet can be forwarded from the SDN 240 to the SDN controller 100 and reinjected once processed (unless a decision is made not to). In other examples, a copy can be sent to the SDN controller 100. Hardware IP tunnels can be used to enable service insertion.

Figure 3:
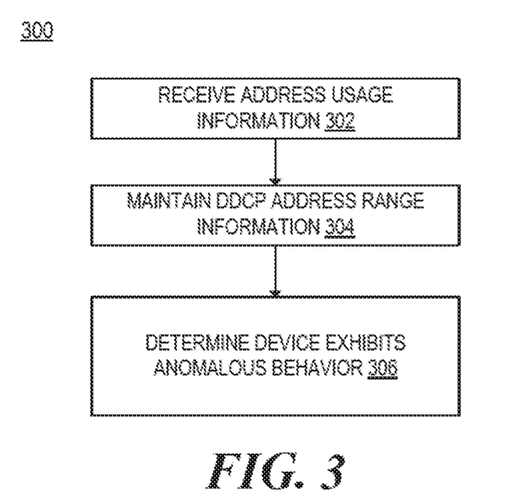
FIG. 3 is a flowchart of a method for determining anomalous behavior of a device based on DDCP address range information, according to one example.
Figure 4:
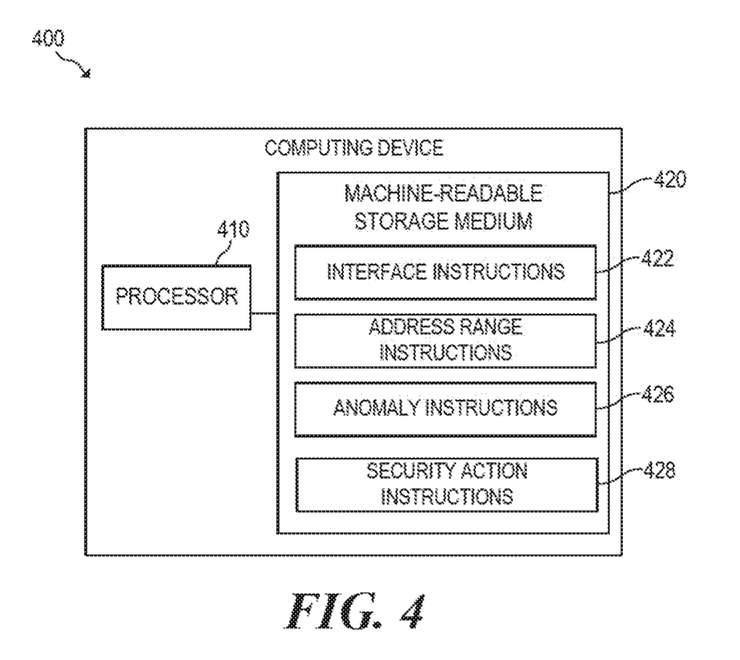
FIG. 4 is a block diagram of a computing device capable of determining anomalous behavior of a device based on DDCP address range information, according to one example.

FIG. 3 is a flowchart of a method for determining anomalous behavior of a device based on DDCP address range information, according to one example. FIG. 4 is a block diagram of a computing device capable of determining anomalous behavior of a device based on DDCP address range information, according to one example.

Although execution of method 300 is described below with reference to computing device 400, other suitable components for execution of method 300 can be utilized (e.g., SDN controller 100). Additionally, the components for executing the method 300 may be spread among multiple devices. Method 300 may be implemented in the form of executable instructions stored on a machine-readable storage medium, such as storage medium 420, and/or in the form of electronic circuitry.

Processor 410 may include at least one central processing unit (CPU), at least one semiconductor-based microprocessor, at least one graphics processing unit (GPU), at least one network processor, other hardware devices suitable for retrieval and execution of instructions stored in machine-readable storage medium 420, or combinations thereof. For example, the processor 410 may include multiple cores on a chip, include multiple cores across multiple chips, multiple cores across multiple devices (e.g., if the computing device 400 includes multiple node devices), or combinations thereof. Processor 410 may fetch, decode, and execute instructions 422, 424, 426, 428 to implement method 300. As an alternative or in addition to retrieving and executing instructions, processor 410 may include at least one integrated circuit (IC), other control logic, other electronic circuits, or combinations thereof that include a number of electronic components for performing the functionality of instructions 422, 424, 426, 428.

Machine-readable storage medium 420 may be any electronic, magnetic, optical, or other physical storage device that contains or stores executable instructions. Thus, machine-readable storage medium may be, for example, Random Access Memory (RAM), an Electrically Erasable Programmable Read-Only Memory (EEPROM), a storage drive, a Compact Disc Read Only Memory (CD-ROM), and the like. As such, the machine-readable storage medium can be non-transitory. As described in detail herein, machine-readable storage medium 420 may be encoded with a series of executable instructions for associating nodes with labels. Further, in some examples, the various instructions 422, 424, 426, 428 can be stored on different media.

At 302, the computing device 400 can execute interface instructions 422 to receive address usage information. As noted above, the address usage information can be associated with a device communicating on a data plane of a network. The network can be implemented using switches, other network elements, or combinations thereof. The computing device 400 can receive the address usage information from at least one of the switches via a control plane. The address usage information can include an address (e.g., an IP address) associated with the device communicating on the data plane. As noted above, the association of the address to the device can be a usage of the address by the device and/or a request to use the address by the device. In some examples, the address usage information can include additional information about the device, such as a MAC address, a port location, and the like.

As noted above, in some examples, the address usage information can be included in an ADP reply message. The computing device can configure switches on the network to send a copy of ADP reply messages used on the data plane of the network to the computing device 400 via the control plane.

At 304, address range instructions 424 can be executed by processor 410 to maintain DDCP address range information about multiple DDCP servers acting on the network. The DDCP address range information can include an IP address range served by each of the DDCP servers. The information can be stored in a data structure. The DDCP address range information includes at least the address ranges assigned by the DDCP server(s) on the network. The DDCP address range information can include what address ranges are served by respective DDCP servers. In one example, the DDCP address range information can include a list or table of assigned network layer addresses (e.g., IP addresses) and corresponding identifiers (e.g., MAC addresses of corresponding devices assigned the respective network layer address).

At 306, anomaly instructions 426 are executed to determine whether the device associated with the address usage information exhibits anomalous behavior. The determination can be based on a rule, the address usage information, and the DDCP address range information. As noted above, the rule can be customized.

In one example, the rule can be configured to determine whether an address (e.g., IP address) used by the device is not assigned to the device. As noted above, this can be based on an analysis of the address range information (e.g., the device's corresponding device identifier (e.g., MAC address) is not assigned the address in the data structure).

The rule can include further parameters as well. In one example, the rule can specify that devices are acting anomalous unless the devices use dynamic addressing. An exception can further be made for known static addressing. In another example, the rule can specify that static addressing is not anomalous.

In some examples, security action instructions 428 can be executed by processor 410 to perform a security action in response to a determined anomaly. For example, access to/from the device associated with the anomaly can restricted and/or terminated. As noted, address usage information may further include a MAC address, a port location, or the like. The restriction of access can be based on the MAC address, the port location, etc. For example, the port may be disabled by sending a message to an associated switch to disable the port. Further, communications to/from the MAC address can be filtered based on a communication to one or more switches.

Figure 5:
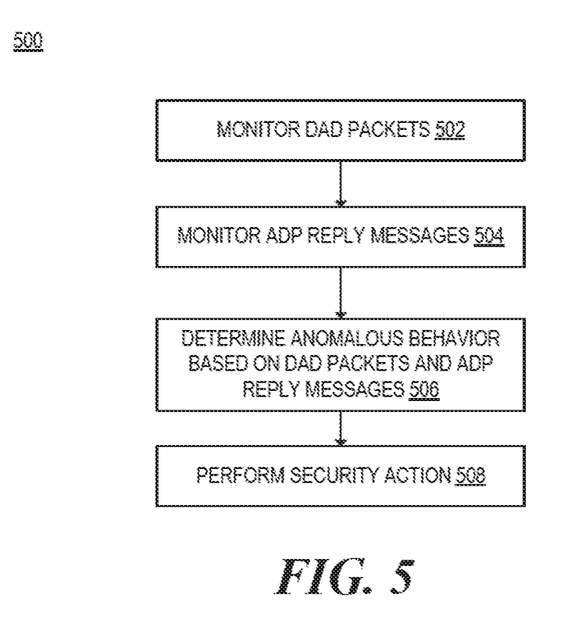
FIG. 5 is a flowchart of a method for determining anomalous behavior based on monitored messages, according to one example.

FIG. 5 is a flowchart of a method for determining anomalous behavior based on monitored messages, according to one example. Although execution of method 500 is described below with reference to computing device 400, other suitable components for execution of method 500 can be utilized (e.g., SDN controller 100). Additionally, the components for executing the method 500 may be spread among multiple devices. Method 500 may be implemented in the form of executable instructions stored on a machine-readable storage medium, such as storage medium 420, and/or in the form of electronic circuitry. In some examples, the computing device 400 includes an SDN controller.

At 502, DAD packets can be monitored for determining whether anomalous behavior is present at a device. A rule can be set by the computing device 400 to cause switches in the network to provide DAD packets to the computing device 400 via a control plane. Moreover, another rule can be set to cause switches to provide copies of ADP reply messages used on a data plane of the network to the computing device 400. As such, at 504, the computing device 400 can monitor ADP reply messages. As noted, the ADP reply messages can include address usage information, which can include the address used by the device.

At 506, the computing device 400 determines that the device exhibits anomalous behavior. The anomalous behavior is based on a rule set in the computing device. In one example, the rule indicates that anomalous behavior is present if the address was used by a device without the device first sending out a DAD packet. This can be because a protocol followed by the SDN would expect the DAD packet to be sent before use of an address. This may be used, for example, in an IPv6 implementation.

At 508, a security action can be performed based on the determination of anomalous behavior. In one example, the security action may be include reporting the behavior. In another example, the security action may include restricting access to the device.

What is claimed is:

1. A software defined networking (SDN) controller, comprising:
   at least one processor; and
   a memory including instructions that when executed by the at least one processor of the SDN controller, cause the SDN controller to:
   receive, via an interface engine, address usage information for a device communicating on a data plane of a network implemented using a plurality of switches,
   wherein the SDN controller receives the address usage information from one of the switches via a control plane separate from the data plane;
   maintain Dynamic Device Configuration Protocol (DDCP) address range information for the network,
   wherein the interface engine receives, on the control plane, a copy of packets with DDCP address range information,
   wherein the packets are used on the data plane via respective switches, and wherein the address range information is maintained based on the copy of the packets; and
   determine that the device exhibits anomalous behavior based on a set of rules, the address usage information, and the DDCP address range information.

2. The SDN controller of claim 1,
   wherein the address usage information includes an address used by the device on the network,
   wherein the DDCP address range information includes a list of a plurality of assigned addresses and corresponding device identifiers, and
   wherein the anomalous behavior determination is based on a determination that the device is not assigned the address used by the device.

3. The SDN controller of claim 2,
   wherein the DDCP address range information further includes a timeout time,
   wherein the interface engine further causes sending of an Address Determination Protocol (ADP) resolution request message over the data plane for the address based on the timeout time,
   wherein the reception of the address usage information is based on the ADP resolution request message, and
   wherein the anomalous behavior determination is further based on the timeout time expiring.

4. The SDN controller of claim 2, wherein the switches are further to provide a copy of Address Determination Protocol (ADP) reply messages on the data plane to the SDN controller via the control plane, and wherein the address usage information is included in one of the ADP reply messages.

5. The SDN controller of claim 2, wherein the network includes a plurality of DDCP servers and wherein DDCP address range information includes an address range served by each of the DDCP servers.

6. The SDN controller of claim 1,
   wherein the address usage information includes a request to a DDCP server for a specific address, and
   wherein the anomalous behavior determination is further based on the specific address being previously unused by the device.

7. The SDN controller of claim 1, wherein the address usage information further includes at least one of: a media access control (MAC) address and a port location, and
   wherein the SDN controller is further caused to:
   restrict access to at least one of: the MAC address and the port location based on the determination of anomalous behavior.

8. The SDN controller of claim 1,
   wherein the interface engine receives duplicate address detection (DAD) packets on the control plane via respective switches,
   wherein the interface engine receives, on the control plane, a copy of Address Determination Protocol (ADP) reply messages used on the data plane via respective switches, wherein the address usage information is included in one of the ADP reply messages and includes the address used by the device on the network,
   wherein the SDN controller is further to determine that the device exhibits the anomalous behavior due to a determination that the address was used without a corresponding DAD packet sent by the device.

9. A method comprising:
   receiving, by at least one processor, address usage information, which includes an Internet Protocol (IP) address associated with a device communicating on a data plane of a network implemented using a plurality of switches,
   wherein the at least one processor receives the address usage information from one of the switches via a control plane separate from the data plane;
   maintaining, by the at least one processor, a Dynamic Device Configuration Protocol (DDCP) address range information about a plurality of DDCP servers acting on the network, wherein the DDCP address range information includes an IP address range served by each of the DDCP servers,
   wherein the at least one processor receives, on the control plane, a copy of packets with DDCP address range information, wherein the packets are used on the data plane via respective switches, and wherein the address usage information is maintained based on the copy of the packets; and
   determining, by the at least one processor, that the device exhibits anomalous behavior based on at least one rule, the IP address, and the DDCP IP address range information.

10. The method of claim 9,
wherein the IP address is used by the device,
wherein the DDCP IP address range information further includes a list of a plurality of assigned IP addresses and corresponding device identifiers, the method further comprising:
determining that the device exhibits anomalous behavior because the IP address used by the device is not assigned to the device on the list based on a corresponding device identifier to the IP address.

11. The method of claim 9, wherein the address usage information further includes at least one of: a media access control (MAC) address and a port location, the method further comprising:
restricting access to at least one of: the MAC address and the port location based on the determination of anomalous behavior.

12. The method of claim 11, further comprising:
receiving, by the at least one processor, a copy of each Address Determination Protocol (ADP) reply message on the data plane via the control plane, and wherein the address usage information is included in one of the ADP reply messages.

13. The method of claim 9, further comprising:
receiving, by the at least one processor, duplicate address detection (DAD) packets on the control plane via respective switches,
receiving, on the control plane, a copy of Address Determination Protocol (ADP) reply messages used on the data plane via respective switches,
wherein the address usage information is included in one of the ADP reply messages and includes the address used by the device on the network, and
determining that the device exhibits the anomalous behavior because the address was used without a corresponding DAD packet sent by the device.

14. A non-transitory machine-readable storage medium storing instructions that, if executed by at least one processor of a device, cause the device to:
receive address usage information, which includes an address associated with a device communicating on a data plane of a network implemented using a plurality of switches,
wherein the device receives the address information from one of the switches via a control plane;
maintain Dynamic Device Configuration Protocol (DDCP) address range information for a plurality of DDCP servers acting on the network, wherein the address range information includes an address range served by each of the DDCP servers;
receive duplicate address detection (DAD) packets on the control plane via respective switches,
receive, on the control plane, a copy of Address Determination Protocol (ADP) reply messages used on the data plane via respective switches,
wherein the address usage information is included in one of the ADP reply messages and includes the address used by the device on the network, and
determine that the device exhibits the anomalous behavior because the address was used without a corresponding DAD packet sent by the device;
and
perform a security action based on the anomalous behavior determination.

15. The non-transitory machine-readable storage medium of claim 14, wherein the interface engine receives, on the control plane, a copy of packets with DDCP address range information, wherein the packets are used on the data plane via respective switches, and wherein the address usage information is maintained based on the copy of the packets.

* * * * *